(12) United States Patent
Hwang et al.

(10) Patent No.: US 8,822,085 B2
(45) Date of Patent: Sep. 2, 2014

(54) NON-AQUEOUS ELECTROLYTE SOLUTION FOR LITHIUM SECONDARY BATTERY AND LITHIUM SECONDARY BATTERY COMPRISING THE SAME

(75) Inventors: Ra-Young Hwang, Daejeon (KR); Ji-Sang Yu, Daejeon (KR)

(73) Assignee: LG Chem, Ltd. (KR)

( * ) Notice: Subject to any disclaimer, the term of this patent is extended or adjusted under 35 U.S.C. 154(b) by 19 days.

(21) Appl. No.: 12/680,297

(22) Filed: Mar. 26, 2010
(Under 37 CFR 1.47)

(65) Prior Publication Data

US 2012/0009487 A1   Jan. 12, 2012

Related U.S. Application Data

(63) Continuation of application No. PCT/KR2009/001792, filed on Apr. 7, 2009.

(30) Foreign Application Priority Data

Apr. 8, 2008 (KR) .................. 10-2008-0032434

(51) Int. Cl.
*H01M 10/05* (2010.01)
*H01M 10/052* (2010.01)
*H01M 10/0569* (2010.01)
*H01M 10/0568* (2010.01)
*H01M 10/0567* (2010.01)

(52) U.S. Cl.
CPC ............ *H01M 10/052* (2013.01); *Y02E 60/122* (2013.01); *H01M 10/0569* (2013.01); *H01M 10/0568* (2013.01); *H01M 2300/0025* (2013.01); *H01M 10/0567* (2013.01)
USPC .......................................... 429/338; 429/199

(58) Field of Classification Search
USPC ........... 429/340, 341, 326, 330, 231.3, 231.1, 429/224, 223, 231.6, 338, 199, 337, 339, 429/342, 343
See application file for complete search history.

(56) References Cited

U.S. PATENT DOCUMENTS

| | | | |
|---|---|---|---|
| 6,495,293 | B1 | 12/2002 | Arai et al. |
| 7,829,226 | B2 * | 11/2010 | Zhao et al. ................ 429/340 |
| 2002/0164531 | A1 | 11/2002 | Sekino et al. |
| 2003/0148191 | A1 | 8/2003 | Mori |
| 2004/0013946 | A1 | 1/2004 | Abe et al. |

FOREIGN PATENT DOCUMENTS

| | | |
|---|---|---|
| JP | 200215771 A | 7/2003 |
| JP | 2003197253 A | 7/2003 |
| JP | 2004022523 A | 1/2004 |
| JP | 2004179146 A | 6/2004 |
| JP | 2005285563 A | 10/2005 |
| JP | 2008077950 A | 4/2008 |
| KR | 20040006429 A | 1/2004 |

* cited by examiner

*Primary Examiner* — Mark F Huff
*Assistant Examiner* — Monique Wills
(74) *Attorney, Agent, or Firm* — Lerner, David, Littenberg, Krumholz & Mentlik, LLP

(57) ABSTRACT

A non-aqueous electrolyte solution for a lithium secondary battery includes a non-aqueous solvent and a lithium salt dissolved in the non-aqueous solvent. The lithium salt includes $LiN(CF_3SO_2)_2$. The non-aqueous electrolyte solution further includes a sulfate-based compound and vinylene carbonate. A lithium secondary battery having the above non-aqueous electrolyte solution may keep overall high temperature performance in a high level and also improve low temperature power characteristics.

6 Claims, No Drawings

NON-AQUEOUS ELECTROLYTE SOLUTION FOR LITHIUM SECONDARY BATTERY AND LITHIUM SECONDARY BATTERY COMPRISING THE SAME

CROSS-REFERENCE TO RELATED APPLICATIONS

The present application is a continuation of National Phase Application No. PCT/KR2009/001792 filed on Apr. 7, 2009, which claims priority under 35 U.S.C. 119(a) to Korean Patent Application No. 10-2008-0032434, filed Apr. 8, 2008, all of which are hereby expressly incorporated by reference into the present application.

TECHNICAL FIELD

The present invention relates to an electrolyte solution for a lithium secondary battery, and a lithium secondary battery having the same. More particularly, the present invention relates to a non-aqueous electrolyte solution for a lithium secondary battery, which may improve both high temperature performance and low temperature power characteristics by containing specific lithium salt and additive.

BACKGROUND OF THE INVENTION

Recently, interests on energy storage technologies are more increased. As the energy storage technologies are extended to cellular phones, camcorders and notebook PC, and further to electric vehicles, the demand for high-energy concentration of a battery used as a power source of such an electronic device is increased. A lithium ion secondary battery is one of the most satisfactory batteries, and many studies are now in active progress.

Among secondary batteries currently used, a lithium secondary battery developed in the early 1990's includes an anode made of carbon material capable of intercalating or disintercalating lithium ions, a cathode made of lithium-containing oxide, and a non-aqueous electrolyte solution obtained by dissolving a suitable amount of lithium salt in a mixed organic solvent.

The lithium secondary battery has an average discharge voltage of about 3.6 to 3.7V, which is advantageously higher than those of other batteries such as alkali batteries or nickel-cadmium batteries. To give such a high operation voltage, an electrolyte composition electrochemically stable in a charging/discharging voltage range from 0 to 4.5V is required. For this purpose, a mixed solvent in which a cyclic carbonate compound such as ethylene carbonate or propylene carbonate and a linear carbonate compound such as dimethyl carbonate, ethylmethyl carbonate or diethyl carbonate are suitably mixed is used as a solvent of electrolyte. A solute of electrolyte commonly uses a lithium salt such as $LiPF_6$, $LiBF_4$, $LiClO_4$ and $LiN(CF_3SO_2)_2$, which serves as a source for supplying lithium ions in a battery and thus enables the lithium battery to operate.

Such a lithium secondary battery demands various characteristics depending on its usage. For example, a high-power battery used as an auxiliary power source of a hybrid vehicle should have high power density and excellent cycle and high temperature charcteristics, and this battery should also have high low-temperature power for helping the vehicle to start at a low temperature.

In this consideration, vinylene carbonate (VC) is used for improving high temperature cycle performance of a lithium secondary battery. However, vinylene carbonate deteriorates low temperature power performance of the battery. Meanwhile, ethylene sulfate is known to attribute to improving low temperature characteristics of a lithium ion battery.

As mentioned above, various kinds of additives have been proposed to improve characteristics of batteries, but there is no non-aqueous electrolyte solution capable of both overall high temperature and low temperature characteristics of batteries.

SUMMARY OF THE INVENTION

Therefore, an aspect of the present invention is to provide a non-aqueous electrolyte solution and a lithium secondary battery having the same, which may keep overall high temperature performance and at the same time improve low temperature power characteristics.

In accordance with an aspect of the present invention, a non-aqueous electrolyte solution for a lithium secondary battery comprises a non-aqueous solvent and a lithium salt dissolved in the non-aqueous solvent, wherein the lithium salt includes $LiN(CF_3SO_2)_2$, and wherein the non-aqueous electrolyte solution further includes a sulfate-based compound expressed by the following chemistry figure 1 and vinylene carbonate.

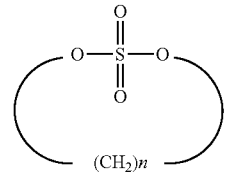

Chemistry FIG. 1 where n is an integer in the range from 2 to 5.

In the non-aqueous electrolyte solution according to an aspect of the present invention, the content of $LiN(CF_3SO_2)_2$ is preferably 0.1 to 0.5 mol, based on 1 mol of the lithium salt.

Also preferably, the contents of the sulfate-based compound and the vinylene carbonate are respectively 0.5 to 10 weight %, based on the total weight of the non-aqueous electrolyte solution. In particular, it is preferred that a content ratio of the sulfate-based compound to the vinylene carbonate is 1:1 to 1:4, and the total content of the sulfate-based compound and the vinylene carbonate is 0.5 to 10 weight %, based on the total weight of the non-aqueous electrolyte solution.

The non-aqueous electrolyte solution explained above may be usefully applied to a common lithium secondary battery having an anode and a cathode.

If the non-aqueous electrolyte solution using LiN $(CF_3SO_2)_2$ as a lithium salt and including a predetermined sulfate compound and vinylene carbonate at the same time is applied to a lithium secondary battery as in the present invention, it is possible to keep excellent high temperature storage characteristics and excellent high temperature cycle characteristics and to improve low temperature power characteristics by lowering battery resistance at a low temperature.

DETAILED DESCRIPTION

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

A non-aqueous electrolyte solution for a lithium secondary battery includes a non-aqueous solvent and a lithium salt. Also, the non-aqueous electrolyte solution includes LiN(CF$_3$SO$_2$)$_2$ as the lithium salt, and the non-aqueous electrolyte solution further includes a sulfate-based compound expressed by the following chemistry figure 1 and vinylene carbonate.

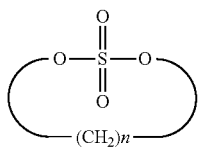

Chemistry FIG. 1 where n is an integer in the range from 2 to 5.

If the non-aqueous electrolyte solution including the sulfate-based compound of the chemistry figure 1, representatively ethylene sulfate, and vinylene carbonate is applied to a battery, the sulfate-based compound with a relatively higher reduction potential is decomposed in advance in comparison to the vinylene carbonate. Accordingly, an SEI film is firstly formed due to the sulfate-based compound, and then an SEI film is formed later due to the vinylene carbonate. The film formed by the sulfate-based compound ensures less resistance, thereby improving low temperature power characteristics of the battery. Meanwhile, the film formed by the vinylene carbonate (VC) improves high temperature characteristics of the battery. The contents of the sulfate-based compound and the vinylene carbonate are preferably 0.5 to 10 weight %, based on the total weight of the non-aqueous electrolyte solution, respectively. In particular, in order to maximize high temperature characteristics while improving low temperature power characteristics, a content ratio of the sulfate-based compound to the vinylene carbonate is preferably 1:1 to 1:4, and the total content of the sulfate-based compound and the vinylene carbonate is preferably 0.5 to 10 weight %, based on the total weight of the non-aqueous electrolyte solution.

However, the film formed by the sulfate-based compound is relatively weaker at a high temperature in comparison to the film formed by the vinylene carbonate, so it is not easy to sufficiently improve high temperature characteristics of a battery only using the above two additives. Thus, in the present invention, LiN(CF$_3$SO$_2$)$_2$, namely LiTFSI [lithium bis(trifluoromethylsulfonyl)imide], is additionally used. The inventors found that, when LiTFSI was added as a lithium salt to the non-aqueous electrolyte solution including the above two components, high temperature storage characteristics and high temperature cycle characteristics were kept very excellently, and also low temperature power characteristics were improved. The present invention was conceived from such a point of view.

In the non-aqueous electrolyte solution of the present invention, the content of LiN(CF$_3$SO$_2$)$_2$ is preferably 0.1 to 0.5 mol, based on 1 mol of the lithium salt, for maximizing the performance of a battery. The lithium salt employed in the non-aqueous electrolyte solution may use not only LiTFSI mentioned above but also a mixture of well-known lithium salts such as LiPF$_6$, LiBF$_4$ and LiClO$_4$. Among them, it is preferred that 0.5 to 0.8 mol of LiPF$_6$ and LiBF$_4$ are used in combination, based on 1 mol of the entire lithium salt.

The lithium salt is put to the non-aqueous electrolyte solution commonly in an amount of 0.3 M or above, preferably 0.5 M or above, more preferably 0.7 M or above, most preferably 0.8 M or above. At the same time, an amount of the lithium salt is preferably 2.5 M or less, more preferably 2.0 or less, further preferably 1.6 M or less, most preferably 1.2 M or less.

Meanwhile, the non-aqueous electrolyte solution used in the non-aqueous electrolyte solution of the present invention may be any one selected from the group consisting of a cyclic carbonate selected from the group consisting of propylene carbonate and vinylene carbonate, or their mixtures, a linear carbonate selected from the group consisting of diethyl carbonate, dimethyl carbonate, methylethyl carbonate and dipropyl carbonate, or their mixtures, dimethyl sulfoxide, acetonitrile, dimethoxyethane, diethoxyethane, sulforan, gamma-butyrolactone, tetrahydrofuran, ethyl propionate and propyl propionate, or their mixtures, but not limitedly. For example, at least two kinds of various solvents may be preferably used in combination, such as a combination of cyclic carbonate and linear carbonate, a combination of cyclic carbonate and lactone, a combination of cyclic carbonate, lactone and linear ester, a combination of cyclic carbonate, linear carbonate and lactone, a combination of cyclic carbonate, linear carbonate and ether, and a combination of cyclic carbonate, linear carbonate and linear ester. Among them, a combination of cyclic carbonate and linear carbonate or a combination of cyclic carbonate, lactone and linear ester is preferred. A ratio of cyclic carbonate to linear carbonate is preferably 1:9 to 7:3. In case only cyclic carbonate is used, the electrolyte may not serve a suitable function due to high viscosity.

Meanwhile, the non-aqueous electrolyte solution of the present invention, explained above, is used for a lithium secondary battery. In other words, the non-aqueous electrolyte solution is impregnated in an electrode assembly in which a separator is interposed between a cathode and an anode.

The cathode active material used for the cathode of the present invention may be a layered compound such as lithium cobalt oxide (LiCoO$_2$) and lithium nickel oxide (LiNiO$_2$) or a compound substituted with one or more transition metal; lithium manganese oxide such as Li$_{1+x}$Mn$_{2-x}$O$_4$ (here, x is 0 to 0.33), LiMnO$_3$, LiMn$_2$O$_3$ and LiMnO$_2$; lithium copper oxide (Li$_2$CuO$_2$); vanadium oxide such as LiV$_3$O$_8$, LiFe$_3$O$_4$, V$_2$O$_5$ and Cu$_2$V$_2$O$_7$; lithium nickel oxide expressed by LiNi$_{1-x}$M$_x$O$_2$ (here, M=Co, Mn, Al, Cu, Fe, Mg, B or Ga, and x=0.01 to 0.3); lithium manganese composite oxide expressed by LiMn$_{2-x}$M$_x$O$_2$ (here, M=Co, Ni, Fe, Cr, Zn or Ta, and x=0.01 to 0.1) or Li$_2$Mn$_3$MO$_8$ (here, M=Fe, Co, Ni, Cu or Zn); LiMn$_2$O$_4$ of which Li is partially substituted with alkali earth metal; disulfide compound; Fe$_2$(MoO$_9$)$_3$ and so on, but not limitedly. Preferably, the cathode active material may be lithium cobalt oxide, lithium manganese oxide, lithium nickel oxide, lithium manganese-cobalt-nickel oxide, or their mixtures.

The cathode may be manufactured by mixing the above cathode active material with conductive material such as acetylene black or carbon black or a binder such as poly(tetrafluoroethylene)(PTFE), poly(vinylidene fluoride) (PVdF), a copolymer of styrene and butadiene (SBR), a copolymer of acrylonitrile and butadiene (NBR), or carboxy methyl cellulose (CMC), rolling the cathode active material along with an aluminum foil or a stainless lath plate to make a cathode, current collector, and then heating the same at about 50° C. to 250° C. for about 2 hours under vacuum.

The anode active material used for the anode of the present invention may be carbon or graphite materials such as natural graphite, artificial graphite, expanded graphite, carbon fiber, non-graphitizable carbon, carbon black, carbon nano tube, fullerene and activated carbon; metals alloyable with lithium such as Al, Si, Sn, Ag, Bi, Mg, Zn, In, Ge, Pb, Pd, Pt and Ti and compounds including such elements; composite materials of the metals or their compounds and the carbon and graphite materials; and lithium-containing nitrides, but not limitedly. Preferably, crystalline carbon, amorphous carbon, silicon-based active materials, tin-based active materials and silicon-carbon-based active materials may be used as the anode active material in single or in combination. In addition, such an anode active material may further include common binders, conductive materials and other additives, of which the kinds and the contents may be determined in a common way.

The binder is used for assisting in coupling the active material and the conductive material and also coupling the current collector, and commonly 1 to 50 weight % of binder is added, based on the total weight of electrode assembly. This binder may be polyvinylidene fluoride (PvDF), polyvinyl alcohol, carboxy methyl cellulose (CMC), starch, hydroxy propyl cellulose, regenerated cellulose, polyvinylpyrrolidone, tetrafluoroethylene, polyethylene, polypropylene, ethylene-propylene-diene polymer (EPDM), sulfonated-EPDM, styrene-butadiene rubber, fluorine rubber, and their copolymers.

The conductive material is used for further improving conductivity of the electrode active material, and 1 to 20 weight % of conductive material may be added, based on the total weight of the electrode assembly. The conductive material is not specially limited if it has conductivity without causing chemical change to a corresponding battery. For example, the conductive material may use graphite such as natural graphite and artificial graphite; carbon black such as acetylene black, Ketjen black, channel black, furnace black and lamp black; conductive fiber such as carbon fiber and metal fiber; metal powder such as carbon fluoride, aluminum or nickel powder; conductive metal oxides such as zinc oxide, potassium titanate and titan oxide; and conductive materials such as polyphenylene derivatives.

The filler is selectively used as a component for controlling expansion of the anode, and the filler is not specially limited if it is a fibrous material causing no electrical change to the corresponding battery. For example, the filler may use olefin-based polymers such as polyethylene and polypropylene; and fibrous material such as glass fiber and carbon fiber.

The separator is interposed between the cathode and the anode, and it employs an insulating thin film ensuring high ion transmission and excellent mechanical strength. The separator generally has a pore size of 0.01 to 10 μm and a thickness of 5 to 300 μm. The separator may use, for example, olefin-based polymers such as chemical-resistant hydrophobic propylene; sheets or non-woven fabrics made of glass fiber or polyethylene; and kraft paper. Currently, Celgard series (Celgard™ 2400, 2300, produced by Hoechst Celanese Corp.), polypropylene separators (produced by Ube Industries Ltd. or Pall RAI), and polyethylene series (Tonen or Entek) are representatively available in the market.

The structure of the lithium secondary battery according to the present invention is not specially limited. For example, the lithium secondary battery may be a coin-type battery having a cathode, an anode and a single-layer or multi-layer separator, or a cylindrical or angled battery having a cathode, an anode and a roll-type separator.

The lithium secondary battery using the non-aqueous electrolyte solution according to the present invention is manufactured by inserting an electrode group having a cathode and an anode, prepared in a common way, into a battery case, and then injecting the non-aqueous electrolyte solution of the present invention into the case. This battery case may have a metal can shape or a pouch shape made of metal laminate.

EXAMPLES

Hereinafter, the present invention is explained in more detail using Examples and Comparative examples. However, the following Examples exist only for illustration purpose, and scope of the present invention should not be interpreted as limited thereto.

Preparation of Non-Aqueous Electrolyte Solution

Example 1

1 weight % of ethylene sulfate (ESa) and 2 weight % of vinylene carbonate (VC) were added to a mixture solvent in which ethylene carbonate and methylethylcarbonate were mixed in a volume ratio of 1:2. Subsequently, 0.9M of $LiPF_6$ and 0.1M of LiTFSI were added thereto as lithium salt to prepare a non-aqueous electrolyte solution.

Example 2

A non-aqueous electrolyte solution was prepared in the same way as the Example 1, except that the added lithium salt was changed into 0.8M of $LiPF_6$ and 0.2M of LiTFSI.

Example 3

A non-aqueous electrolyte solution was prepared in the same way as the Example 1, except that the added lithium salt was changed into 0.5M of $LiPF_6$ and 0.5M of LiTFSI.

Comparative Example 1

2 weight % of vinylene carbonate was added to a mixture solvent in which ethylene carbonate and methylethylcarbonate were mixed in a volume ratio of 1:2. Subsequently, 1M of $LiPF_6$ was added thereto as lithium salt to prepare a non-aqueous electrolyte solution.

Comparative Example 2

1 weight % of ethylene sulfate was added to a mixture solvent in which ethylene carbonate and methylethylcarbonate were mixed in a volume ratio of 1:2. Subsequently, 1M of $LiPF_6$ was added thereto as lithium salt to prepare a non-aqueous electrolyte solution.

Comparative Example 3

1 weight % of ethylene sulfate and 2 weight % of vinylene carbonate were added to a mixture solvent in which ethylene carbonate and methylethylcarbonate were mixed in a volume ratio of 1:2. Subsequently, 1M of $LiPF_6$ was added thereto as lithium salt to prepare a non-aqueous electrolyte solution.

Comparative Example 4

1 weight % of ethylene sulfate was added to mixture solvent in which ethylene carbonate and methylethylcarbonate were mixed in a volume ratio of 1:2. Subsequently, 0.8M of LiPF$_6$ and 0.2M of LiTFSI were added thereto as lithium salt to prepare a non-aqueous electrolyte solution.

Main components used in the above examples and comparative examples are listed in the following table 1.

TABLE 1

|  | Lithium Salt | | Additive | |
|---|---|---|---|---|
|  | LiPF$_6$ | LiTFSI | VC | ESa |
| Example 1 | 0.9M | 0.1M | 2% | 1% |
| Example 2 | 0.8M | 0.2M | 2% | 1% |
| Example 3 | 0.5M | 0.5M | 2% | 1% |
| Comparative Example 1 | 1.0M | — | 2% | — |
| Comparative Example 2 | 1.0M | — | — | 1% |
| Comparative Example 3 | 1.0M | — | 2% | 1% |
| Comparative Example 4 | 0.8M | 0.2M | — | 1% |

Manufacture of Battery

A cathode containing lithium manganese oxide and a cathode containing carbon were laminated together with a separator (polypropylene) to make a laminate-type lithium ion battery. After the electrode assembly was inserted into a battery case, and then the non-aqueous electrolyte solution prepared according to the examples 1 to 3 and the comparative examples 1 to 4 was injected into the battery case, thereby manufacturing a lithium secondary battery.

Low Temperature Power Characteristics

Constant powers of 100, 110, 120, 130, 140 and 150 W were applied to the manufactured battery at −30° C. for 2 seconds, respectively, and then discharge power was measured. The measurement results are listed in the following table 2.

High Temperature Characteristics

After the battery was initially charged and discharged in the above way, the battery was kept at 60° C. for 4 weeks, and then its capacity retention ratio and power retention ratio were measured. The measurement results are also listed in the following table 2.

TABLE 2

| | | BATTERY | | | |
|---|---|---|---|---|---|
| | | Kept at 60° C. for 4 weeks | | 45° C., 1C/1C, 300 cycle | |
| Non-aqueous electrolyte solution used | Low temperature power characteristics (W/Ah) | Capacity retention ratio (%) | Power retention ratio (%) | Capacity retention ratio (%) | Power retention ratio (%) |
| Example 1 | 26 | 92 | 82 | 95 | 85 |
| Example 2 | 27 | 92 | 83 | 96 | 87 |
| Example 3 | 26 | 93 | 84 | 96 | 87 |
| Comparative Example 1 | 20 | 87 | 76 | 91 | 76 |
| Comparative Example 2 | 35 | 77 | 62 | 75 | 57 |
| Comparative Example 3 | 25 | 89 | 79 | 94 | 83 |
| Comparative Example 4 | 34 | 86 | 76 | 88 | 75 |

Seeing the results in the table 2, it would be found that the batteries prepared according to the examples using the non-aqueous electrolyte solution containing sulfate-based compound and vinylene carbonate together while using a lithium salt exhibit improved low temperature power characteristics in comparison to the batteries of the comparative example 1 to which only vinylene carbonate is added, and also the batteries of the examples exhibit more excellent high temperature performance than the batteries of the comparative examples.

What is claimed is:

1. A non-aqueous electrolyte solution for a lithium secondary battery comprising a non-aqueous solvent and additives comprising:
   (A) a lithium salt;
   (B) a sulfate-based compound expressed by the following Chemistry Figure 1, Chemistry FIG. 1

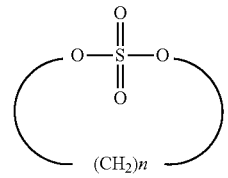

where n is an integer in the range from 2 to 5; and
   (C) vinylene carbonate;
   wherein the lithium salt comprises a mixture of:
      (1) 0.1 to 0.5 mol LiN(CF$_3$SO$_2$)$_2$ based on 1 mol total of lithium salts present in the mixture; and
      (2) 0.5 to 0.9 mol of LiPF$_6$, based on 1 mol total of lithium salts present in the mixture.

2. The non-aqueous electrolyte solution for a lithium secondary battery according to claim 1, wherein the contents of the sulfate-based compound and the vinylene carbonate are respectively 0.5 to 10 weight %, based on the total weight of the non-aqueous electrolyte solution.

3. The non-aqueous electrolyte solution for a lithium secondary battery according to claim 2, wherein a content ratio of the sulfate-based compound to the vinylene carbonate is 1:1 to 1:4, and the total content of the sulfate-based compound and the vinylene carbonate is 0.5 to 10 weight %, based on the total weight of the non-aqueous electrolyte solution.

4. The non-aqueous electrolyte solution for a lithium secondary battery according to claim 1, wherein the sulfate-based compound is ethylene sulfate.

5. The non-aqueous electrolyte solution for a lithium secondary battery according to claim 1, wherein the non-aqueous electrolyte solvent is selected from the group consisting of:
   (a) cyclic carbonates selected from the group consisting of ethylene carbonate, propylene carbonate and their mixtures; a
   (b) linear carbonates selected from the group consisting of diethyl carbonate, dimethyl carbonate, methylethyl carbonate dipropyl carbonate, and their mixtures;
   (c) dimethyl sulfoxide, acetonitrile, dimethoxyethane, diethoxyethane, sulforan, gamma-butyrolactone, tetrahydrofuran, ethyl propionate, propyl propionate, and their mixtures; and
   mixtures thereof.

6. A lithium secondary battery, which includes an anode, a cathode and a non-aqueous electrolyte solution, wherein the non-aqueous electrolyte solution is a non-aqueous electrolyte solution defined in claim 1.

* * * * *